United States Patent [19]
Walker et al.

[11] Patent Number: 5,141,816
[45] Date of Patent: Aug. 25, 1992

[54] COMPOSITE STRUCTURE OF A FIRST HEAT CURABLE RUBBER POLYMER MATERIAL AND A SECOND HEAT CURABLE RUBBER POLYMER MATERIAL HAVING A HOMOGENEOUS CHEMICAL BOND

[75] Inventors: Francis J. Walker, Maple Grove; Vernon C. Ralph; Donald F. Beauchaine, both of Minneapolis, all of Minn.

[73] Assignee: Honeywell Inc., Minneapolis, Minn.

[21] Appl. No.: 439,132

[22] Filed: Nov. 20, 1989

[51] Int. Cl.⁵ .................. B32B 7/04; B32B 25/12
[52] U.S. Cl. .................. 428/420; 428/447; 428/493; 428/495; 428/519
[58] Field of Search .............. 428/420, 447, 519, 493, 428/495

[56] References Cited

U.S. PATENT DOCUMENTS

| | | | |
|---|---|---|---|
| 3,058,859 | 10/1962 | Amberg | 428/495 |
| 4,869,968 | 9/1989 | Coran et al. | 428/495 |
| 5,002,808 | 3/1991 | Hahn et al. | 428/420 |

FOREIGN PATENT DOCUMENTS

| | | | |
|---|---|---|---|
| 1540133 | 12/1969 | Fed. Rep. of Germany | 428/420 |
| 1016933 | 1/1986 | Japan | 428/420 |

*Primary Examiner*—P. C. Sluby
*Attorney, Agent, or Firm*—Charles G. Mersereau; Ian D. MacKinnon

[57] ABSTRACT

A method of molding articles having layers or sections of varying hardness in which the interface between the diverse hardness consists of a permanent homogeneous intermaterial crosslink and therefore continuous chemical bond. The invention contemplates using combinations of selected peroxide catalyzed reactions to crosslink very high molecular weight, heat curable, high consistency polymers of diverse cured hardness across composition boundaries. The technique involves combining selected heat-curable materials of various hardnesses and combining each with selected peroxide crosslinking catalysts having various half-lifes with respect to free radical decay.

8 Claims, 3 Drawing Sheets ns directed to the combination of two or more portions or sections, heat curable organic or inorganic rubber materials of decidedly different hardnesses crosslinked to form a single chemically bonded article.

COMPOSITE STRUCTURE OF A FIRST HEAT CURABLE RUBBER POLYMER MATERIAL AND A SECOND HEAT CURABLE RUBBER POLYMER MATERIAL HAVING A HOMOGENEOUS CHEMICAL BOND

The Government has rights in this invention pursuant to Contract No. DAAA09-81-G-0010/0014, awarded by the Department of the Army.

BACKGROUND OF THE INVENTION

1. Field of the Invention

The present invention relates to the field of molding articles of rubber or rubber like compositions in which materials of at least two decidedly different hardnesses are integrally combined. More particularly, the invention is directed to the combination of two or more portions or sections, heat curable organic or inorganic rubber materials of decidedly different hardnesses crosslinked to form a single chemically bonded article.

2. Discussion of Related Art

Typically rubber or rubber like parts are formed by placing a homogeneous mixture of the uncured rubber or polymer material in a mold admixed with a catalyst and/or accelerator for curing the article by heat under pressure. This produces a molded article of constant hardness. However, in certain specialized applications, multiple hardness attributes are desirable in a single molded part. An example of such an application where a dual hardness article is required occurs in a vacuum pick-up operation. In that instance, the rubber part is attached to a pick-up fixture where a vacuum is applied and pick-up is actuated. In this type of assembly strength is needed at the fixture/rubber interface (which is not obtainable in a soft material) while softness and conformability is required at the object/rubber interface. In the related art, for many applications where a multiple hardness article is desired, a homogenous material of intermediate hardness is selected thereby compromising both desired attributes of the system.

In the relevant art, composite or laminated article structures have been created utilizing adhesives to fix the parts together or otherwise achieve adhesion between layers or parts of diverse hardness. These adhesives, however, are often limited durability and tend to deteriorate or degrade with time; and eventual separation of the joined sections or laminated layers occurs. In an alternative method of forming multi hardness composite materials, granule or bulk uncured solid materials (such as unvulcanized rubber) are assembled in a mold fashioned in the desired configuration and cured in situ thereby, fusing as in welding, the several diverse materials together to form an integral appliance. The compositions of the uncured compositions may be varied so that the same or concurrent curing conditions promote a different hardness in each composition. While this method can produce an article with multiple hardness sections, the weld does not preserve the integrity of the interface between the diverse compositions and separations readily occur. Such a device is illustrated and described in U.S. Pat. No. 4,448,735 to Huge.

In a different technique, a shaped article of polymeric material is formed using a combination of one polymeric compound which is weldable, e.g., by heat and at least one polymeric compound which can be crosslinked by high energy radiation, for example, electron beam radiation or X-ray. In this technique, the cross linkable polymeric component is distributed within the shaped structure and crossed linked on itself, as desired, based on exposure to high energy radiation. This approach is illustrated by Simm et al in U.S. Pat. No. 4,447,488.

None of these techniques, however, solves the problem of producing a uniform, high-strength homogeneous chemical bond at the interface joining plurality of abutting compositions of diverse hardness such that an integral article structure of multiple hardness attributes is produced. It seems that prior techniques either produce a composite which is of unreliable durability with respect to aging and use or which represents a compromise in the desired hardness properties such that the ultimate goals are not achieved.

SUMMARY OF THE INVENTION

By means of the present invention, problems associated with a permanent chemical bonding between materials of decidedly dissimilar hardness is overcome. The invention contemplates utilizing combinations of selected peroxide catalyzed reactions to crosslink very high molecular weight, heat curable, high consistency (i.e., non-pourable) polymers of diverse cured hardness across composition boundaries. The technique involves combining selected heat-curable materials of various hardnesses and combining each with selected peroxide crosslinking catalysts having various half-lifes with respect to free radical decay. In this manner creating novel molded articles having layers or sections of varying hardness in which the interface between the diverse hardnesses consists of a permanent homogenous intermaterial crosslink and therefore a continuous chemical bond. The polymers usable with the invention include both inorganic polymer rubber or rubberlike materials, exemplified by the silicone rubber class, and diverse organic rubber or rubberlike materials such as polysulfides and acrylonitrile-butadiene rubbers.

According to the present invention it has been found that composites of multiple-hardness resilient polymer material objects can be molded in a single process. The process involves starting with an amount of a first raw polymer material of the multi-hardness composite article sought to be fabricated having known curing characteristics and cured hardness. This first polymer material is admixed with an amount of selected peroxide catalyst and placed in a heat-curing pressure mold in a cavity of the desired shape. The molding process is initiated in accordance with the curing characteristic of the material and carried on to a predetermined point of partial cure (normally $\leq 25\%$ of full cure). Cure is then interrupted and the mold containing the first material is removed from the heat and pressure in a de-mold step. The second desired composition material, also blended with a selected peroxide catalyst, is added abutting the first material so as to produce the desired composite article configuration. The mold is then returned to the desired conditions of heat and pressure for additional curing such that both materials are cured to the desired percentage of complete cure. Sufficient crosslinking occurs between the diverse materials to assure a permanent homogeneous chemical bond.

While the amount of initial cure may be varied as desired, it has been found that, generally, if the first material placed in the mold is cured beyond approximately 25% of full cure, the amount of cross linking which subsequently occurs between the first and second material is normally less than desired for maximum bond strength between the diverse materials.

Selection of diverse hardness depends not only on the relative hardness of the two materials with respect to full cure, but also, the relative hardness of the two materials at the percentage of full cure actually used in the process. In addition, it will be appreciated that various peroxide catalysts are available which can, in addition to affecting the time and temperature of cure, effect the amount of cross linking which occurs between the diverse species. In addition to these variables, molding pressure and temperature selected must be compatible with each of the materials involved. Within the scope of the invention, however, it can be seen in a great many combinations of hardnesses of materials are achievable with respect to cured molded articles.

DESCRIPTION OF THE PREFERRED EMBODIMENT

Figure 1:
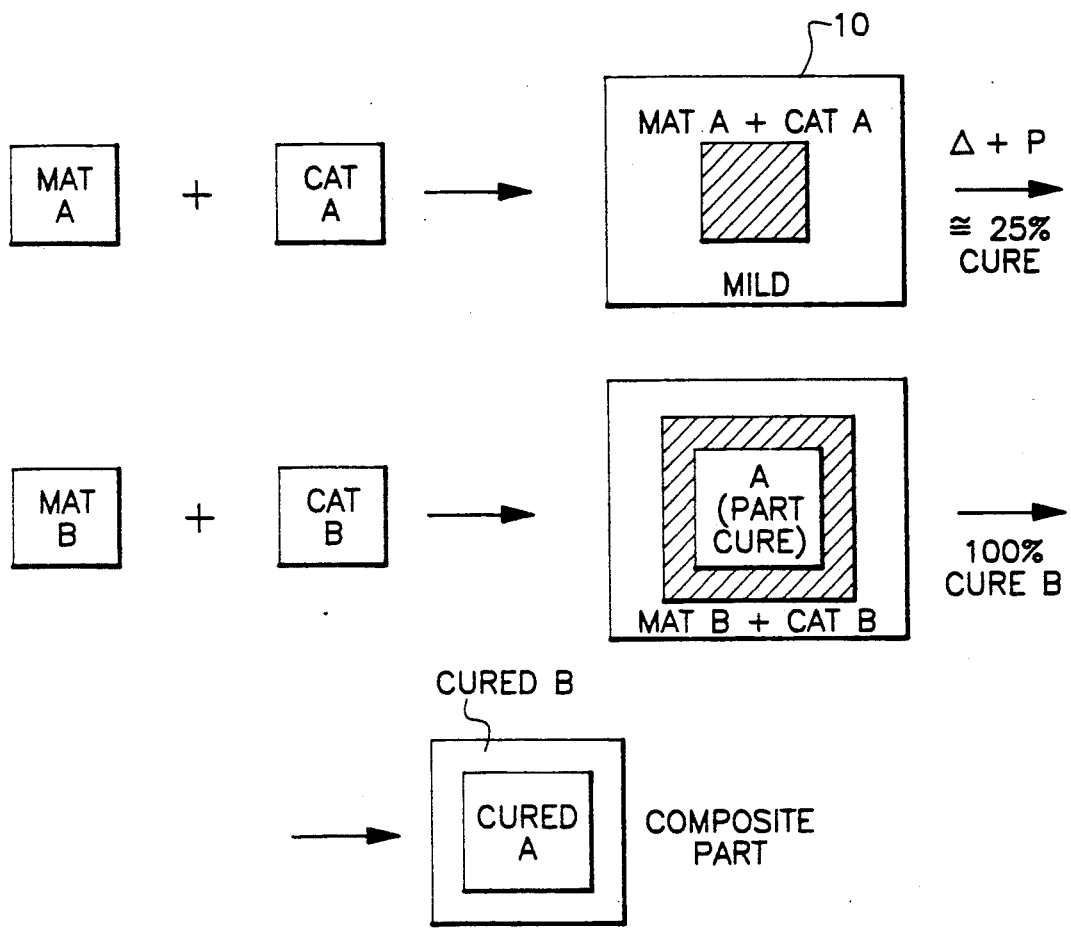
FIG. 1 is a block diagram of a two-material process in accordance with the invention.

FIG. 1 is a block diagram illustrating the molding process in accordance with the invention in which material A and material B which may be any materials selected from a class of organic and inorganic peroxide-catalyzed cross-linkable, heat-curable rubber or rubber-like materials which may be used from a multi-hardness composite article. While either material may be introduced first, in the preferred process, material A is of a lesser hardness than material B.

In the process, material A is first mixed with a selected organic peroxide catalyst and placed in the appropriate mold as at 10. Heat and pressure are then applied to the mold 10 in a well known manner to obtain a partial, nominally approximately 10-25%, cure of the material A. The mold is then removed from the heated, pressurized environment and material B which consists of the material B itself admixed with a selected organic peroxide catalyst is then added to partially cured material such that the materials abut in predetermined manner. In the FIG. 1, for example, material B surrounds material A. This composite is then returned to be cured under heat and pressure until material B has reached the desired cure, normally 100%. This normally assures the complete cure of material A. Normally material A is the softer material.

Figure 2:
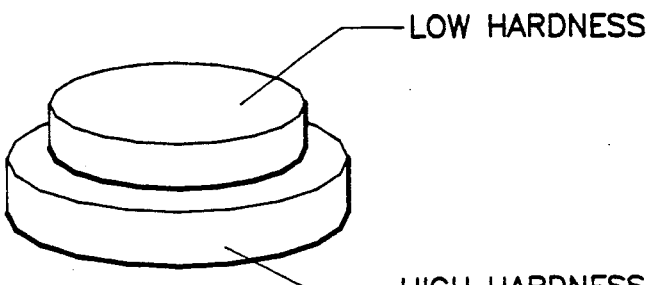
FIG. 2 depicts a typical article which may be made by the process of FIG. 1.

FIG. 2 illustrates a composite article 20 in which the raised central portion 21 is of relatively low hardness material surrounded by a portion 22 which is of higher hardness.

EXAMPLE 1

Figure 3:
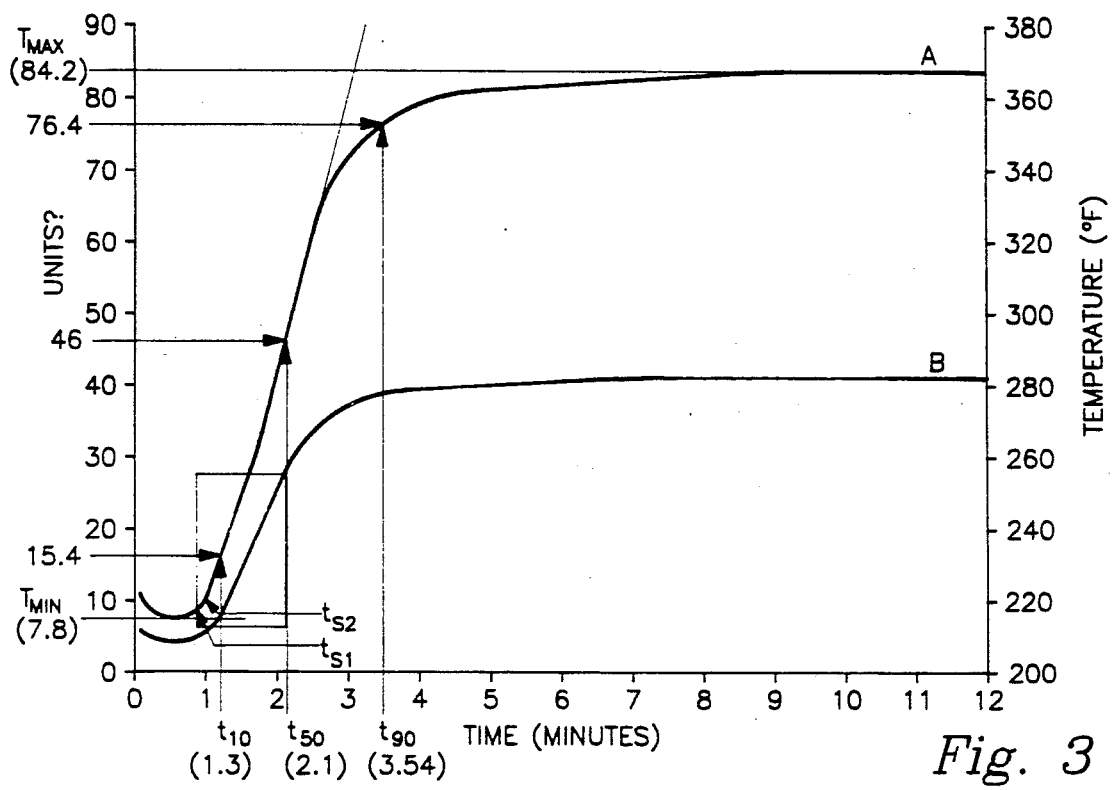
FIG. 3 represents an oscillating disk torque rheograph representing the molding of a composite of high and low hardness silicone materials.

FIG. 3 shows a superimposed dual-trace oscillating disk torque reograph of two different hardness polysiloxane rubber materials. Material B having a cured hardness of 30 Shore A and material A had a cured hardness of approximately 50 Shore A. Both materials utilized a crosslinking catalyst of peroxide of 2,5 bis(t-butylperoxy) - 2,5-dimethylhexane sold under the name Varox, which is a trademark of the RT Vanderbilt Company of Norwalk, Conn. and which is nominally a liquid at room temperature.

Table 1 is reproduced from Handbook of Silicone Rubber Fabrication and illustrates various peroxide materials which can be used as crosslinking catalyzing curing agents for various synthetic rubber compounds.

Figure 4:
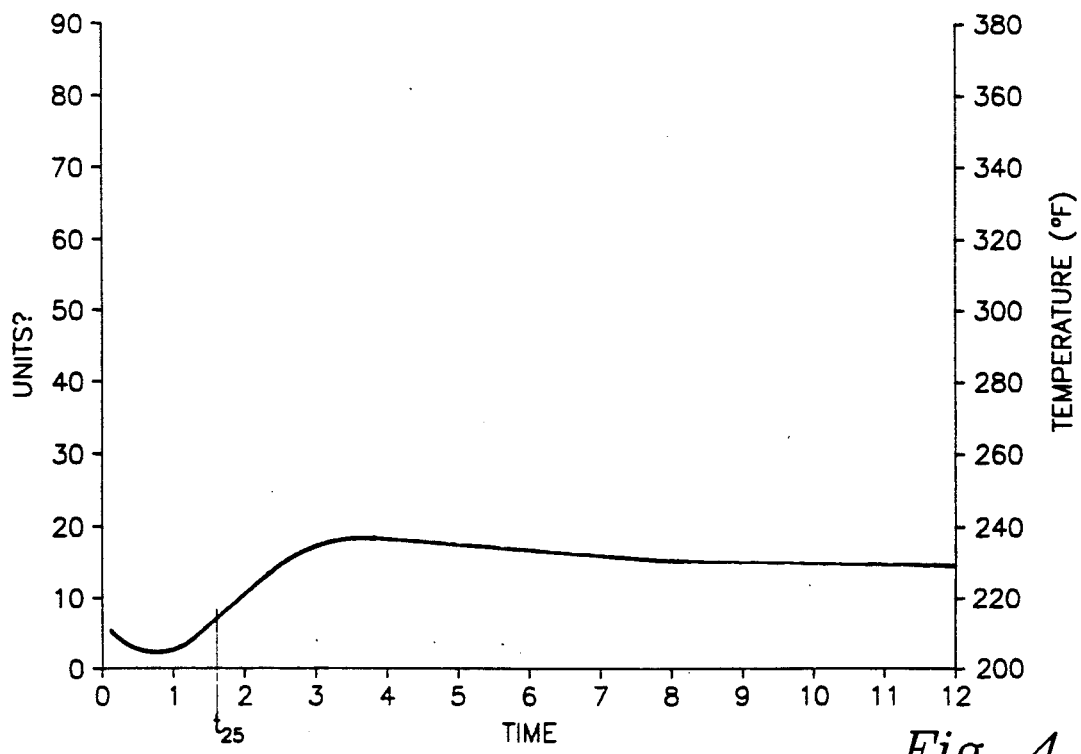
FIGS. 4-6 illustrate cures of other materials usable in the invention.
Figure 5:
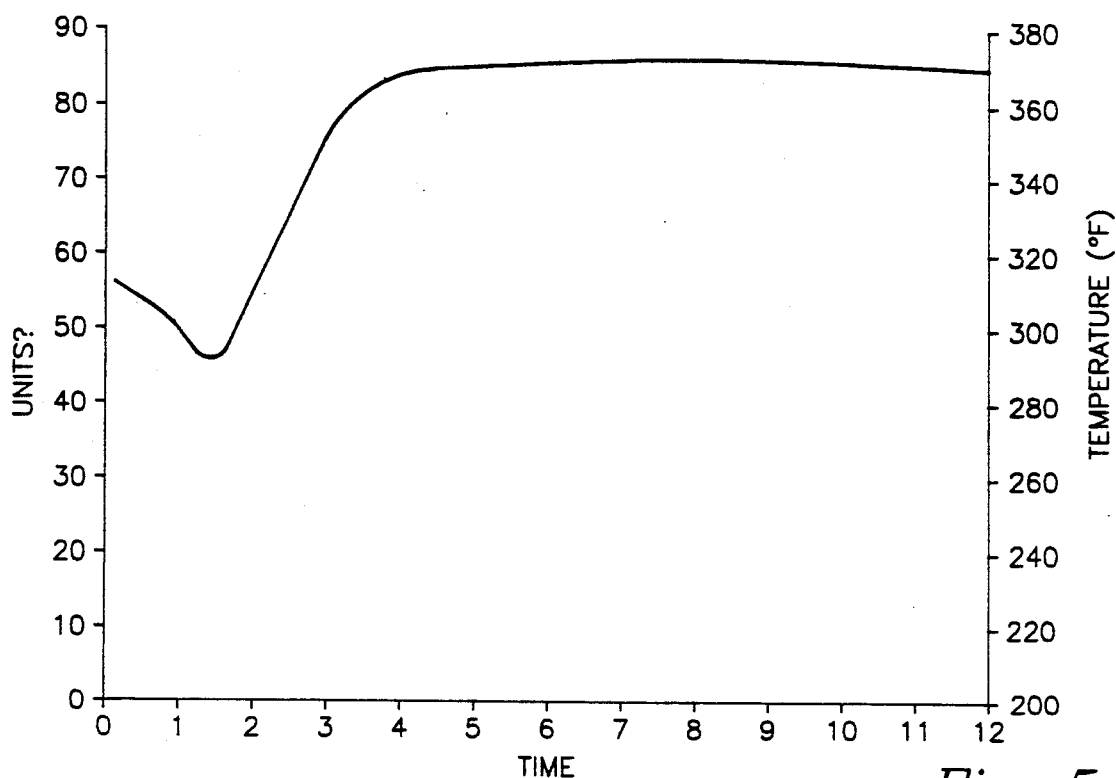
Figure 6:
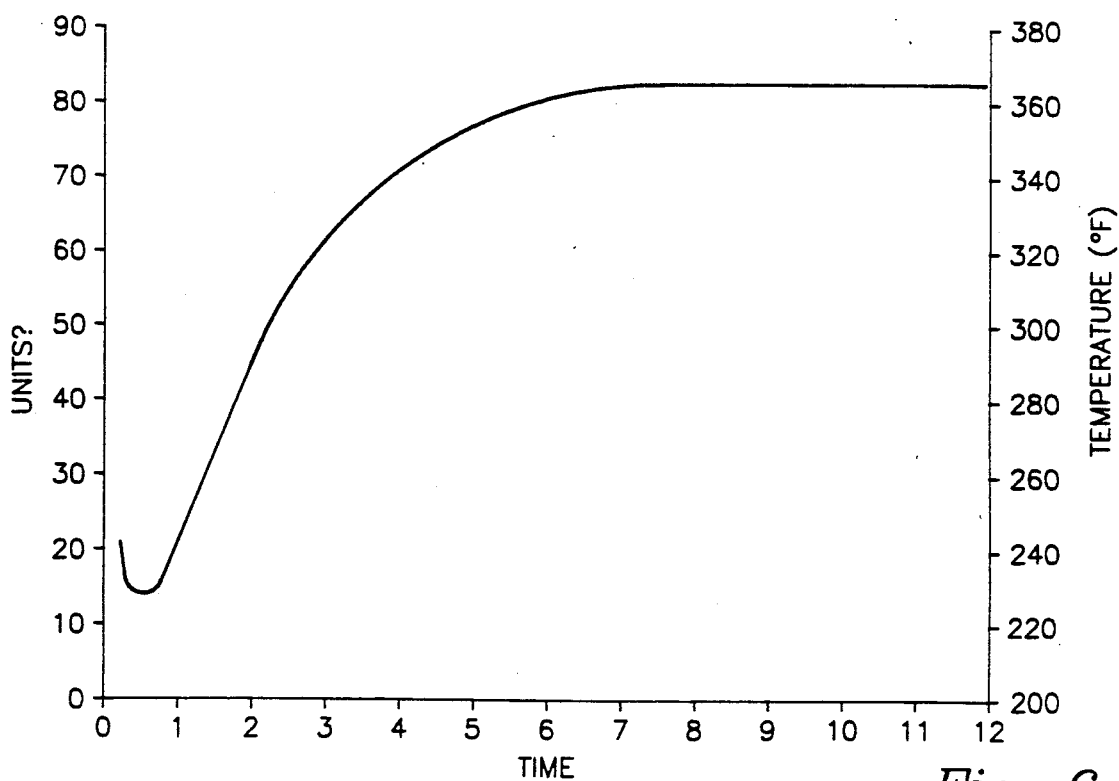

Other examples illustrating the cure of polysulfide and acrylonitrile-butadiene materials are shown in FIG. 4-6. Experiments indicate that any peroxide-crosslinkable, heat-curable rubber or rubberlike polymer materials which are compatible with each other chemically and with the crosslinking catalysts, and which can be cured together to form articles will function successfully in accordance with the invention.

Other non-limiting examples of materials and combinations include:
Styrene-Butadiene Rubber
Ethylene-Propylenes
Epichlorohydrin Rubbers Selection of polymer compound combinations, compound/crosslinking agent combinations, curing temperature and pressure, of course, plays an important role in achieving desired relative hardnesses of portions of each article of manufacture involved. The degree of pre-cure with respect to the first or initial material may be varied to achieve the desired interface or transition boundary crosslinking between the materials of diverse hardnesses. With respect to this,

TABLE 1

| ORGANIC PEROXIDE CURING AGENTS FOR SILICONE RUBBER COMPOUNDS. | | | | | | |
|---|---|---|---|---|---|---|
| Peroxide | Commercial Grade | Form | Active Conc. | % Active Oxygen | Recommended Use | General Cure Temp. (°F.) |
| 2,4-Cl$_2$ Benzoyl peroxide | Cadox TS (50)$^3$ | Paste | 50% | 2.1 | Hot Air | 220–250 |
|  | Luperco CST$^2$ | Paste | 50% |  | Vulcanization |  |
| Benzoyl peroxide | Cadox BSG$^3$ | Paste | 50% |  | Molding, steam, CV | 240–280 |
|  | Luperco AST$^2$ | Paste | 50% | 3.15 | Molding, steam, CV |  |
|  | Cadox 99$^3$ (200 Mesh) | Powder** | 99% | 6.3 | Molding, steam, CV Solution coating |  |
| Dicumyl peroxide* | DiCup 40C$^1$ | Powder | 40% | 2.4 | Thick section and carbon | 320–340 |
|  | DiCup R$^1$ | Crystalline | 99% | 5.9 | Black stocks, CV |  |
| 2,5-bis(t-butyl peroxy)* 2,5-Dimethyl hexane | Varox* | Powder | 50% |  |  | 330–350 |
|  | Luperco 101 XL$^2$ | Powder | 50% | 5.5 | Bonding |  |
|  | Lupersol 101$^2$ | Liquid | 95% |  | Thick section and carbon black |  |
|  | Varox (Liquid)$^5$ | Liquid | 95% | 11.0 |  |  |
| t-Butyl perbenzoate | Same$^2$ | Liquid | 100% | 7.8 | General for high activation-sponge temperatures | 290–310 |
| Ditertiary butyl* peroxide | Same$^{2,7}$ | Liquid | 100% | 10.6 | Thick section and carbon black | 340–360 |
|  | CW-2015$^6$ | Powder | 15% | 1.6 |  |  |
| Cumyl, t-Butyl peroxide* | Trigonox T | Liquid | 95% | 7.2 | Molding, steam, CV | 300–340 |

TABLE 1-continued

ORGANIC PEROXIDE CURING AGENTS FOR SILICONE RUBBER COMPOUNDS.

| Peroxide | Commercial Grade | Form | Active Conc. | % Active Oxygen | Recommended Use | General Cure Temp. (°F.) |
|---|---|---|---|---|---|---|
| α,α'-bis(t-Butyl peroxy) diisopropyl benzene | Vul-Cup 40KE[1] Perkadox 14/40 | Powder Powder | 40% 40% | 3.8 | Molding, steam, CV | 340 |
| 1,1 di-t-Butyl peroxy* 3,3,5-trimethyl cyclohexane | Trigonox 29/40 | Powder | 40% | 4.2 | Molding, steam, CV | 275-325 |
| t-Butyl peroxy* Isopropyl carbonate | B.P.I.C.[4] | Liquid | 100% | 9.1 | Molding and CV | 280-300 |

*Normally limited to use with vinyl-containing base polymers.
**Use powder, not paste, for self-bonding stocks.
Manufacturers:
[1]Hercules Inc.
[2]Lucidol Div., Pennwalt Corp.
[3]Noury Chemical Corp.
[4]PPG Industries.
[5]R. T. Vanderbilt.
[6]Harwick Standard Chemicals.
[7]Shell Chemical Corp.
Courtesy, Silicone Products Dept., General Electric however, it has been found, generally, that if the initial material is cured much beyond twenty-five percent (25%) of full cure, less than the desirable amount of crosslinking occurs with the second material.

Generally, the first material used in the process is the one of the combination having the lower cure temperature (if a difference exists). However, this procedure can and has been reversed with success. The only limitation is that the desired amount of cure in both materials can be achieved in the final article.

The unique articles manufactured exhibit superior physical properties. They exhibit inter-compositional transition boundaries which are as strong and durable as the materials themselves. They can be manufactured at competitive cost and, thus, represent a decided advance in multi-composition molding.

We claim:

1. A multi-hardness rubber article comprising a composite structure having a plurality of contiguous discrete sections of distinct heat-curable rubber polymers of different hardnesses in which the juncture bond between the contiguous sections comprises a chemical bond in the form of an essentially homogenous intermaterial crosslinking between the distinct heat-curable rubber polymers of different hardnesses.

2. The multi-hardness rubber article of claim 1 in which the crosslinking between the distinct heat-curable rubber polymers of different hardnesses is peroxide catalyzed.

3. The multi-hardness rubber article of claim 2 wherein the rubber polymer materials are selected from the group of rubber compounds consisting of silicones, polysulfides, acrylonitrile-butadienes, styrene-butadienes, ethylene-propylenes, epichlorohydrin rubbers or combinations thereof.

4. The multi-hardness rubber article of claim 3 wherein the distinct heat-curable rubber polymers are two polysiloxane rubber materials having different hardnesses and wherein the intermaterial crosslinking catalyst is 2,5 bis(t-butylperoxy)-2-5-dimethylhexane.

5. The multi-hardness rubber article of claim 4 wherein the distinct heat-curable rubber polymers of different hardnesses are selected from polysulfides and acrylonitrile-butadiene materials.

6. The multi-hardness rubber article of claim 1 wherein the number of distinct heat-curable rubber polymers comprising the composite structure is two.

7. The multi-hardness rubber article of claim 6 wherein one of the distinct heat-curable rubber polymers has a lower cure temperature than the other.

8. The multi-hardness rubber article of claim 7 wherein the rubber polymer materials are selected from the group of rubber compounds consisting of silicones, polysulfides, acrylonitrile-butadienes, styrene-butadienes, ethylene-propylenes, epichlorohydrin rubbers or combinations thereof.

* * * * *